Oct. 23, 1962 C. L. WANLASS 3,060,410

LOGIC SYSTEM GATING CIRCUIT

Filed Oct. 11, 1957

INVENTOR

CRAVENS L. WANLASS

BY HIS ATTORNEYS

HARRIS, KIECH, FOSTER & HARRIS

United States Patent Office 3,060,410

Patented Oct. 23, 1962

3,060,410

LOGIC SYSTEM GATING CIRCUIT

Cravens L. Wanlass, Van Nuys, Calif., assignor, by mesne assignments, to Ford Motor Company, Dearborn, Mich., a corporation of Delaware Filed Oct. 11, 1957, Ser. No. 689,622
7 Claims. (Cl. 340—174)

This invention relates to logic systems and in particular to gating circuits utilizing orthogonal magnetic fields for use in instrumenting logic systems.

The logic systems of computers use large quantities of AND and OR gates which may be termed the building blocks of a logic system. The present day semiconductor diode gate, the simplest of the conventional gating circuits, leaves much to be desired in the way of simplicity, particularly as to size, weight, cost, reliability and associated equipment. The size and weight problems become especially pointed in airborne computer applications. Accordingly, it is an object of the invention to provide a gating circuit which is simple, compact, inexpensive and reliable and which is adapted for construction as a unitary package for treatment as a plug-in unit. A further object of the invention is to provide such a gating circuit which requires only electrical conductors and a magnetic material such as iron or ferrite, thereby doing away with the necessity for vacuum tubes, semiconductors, and the like.

It is an object of the invention to provide a gating circuit for use as an AND or OR gate comprising a block of magnetic material having a plurality of conductors passing therethrough, the bias and read conductors being parallel to each other and the sense and proposition conductors being perpendicular to the bias and read conductors. Another object of the invention is to provide a plurality of such gating circuits which may be connected in series and/or parallel to carry out additional computing functions.

It is another object of the invention to provide such a gating circuit in which the magnetic material can be formed in a thin sheet with a large number of such gating circuits positioned in the sheet. A further object of the invention is to provide such a gating circuit which is particularly adapted to the use of ferrite materials as the magnetic material, and in which the ferrite sheet can be formed in the unfired state wtih the conductor openings therein or with the conductors passing therethrough and then fired to harden and cure the ferrite.

It is a further object of the invention to provide a gating circuit utilizing sheets of magnetic material in which the sheets may be hinged together like pages in a book with the sheets fanned out for ease of wiring, the fan of sheets being closed for insertion in the computer. Another object of the invention is to provide a gating circuit in which the wired complex of circuits may be potted or incapsulated for use as a plug-in unit.

The invention also comprises novel details of construction and novel combinations and arrangements of parts, which will more fully appear in the course of the following description. The drawing merely shows and the description merely describes preferred embodiments of the present invention which are given by way of illustration or example.

Figures 1, 2, 3, 4, 5, 6, 7:
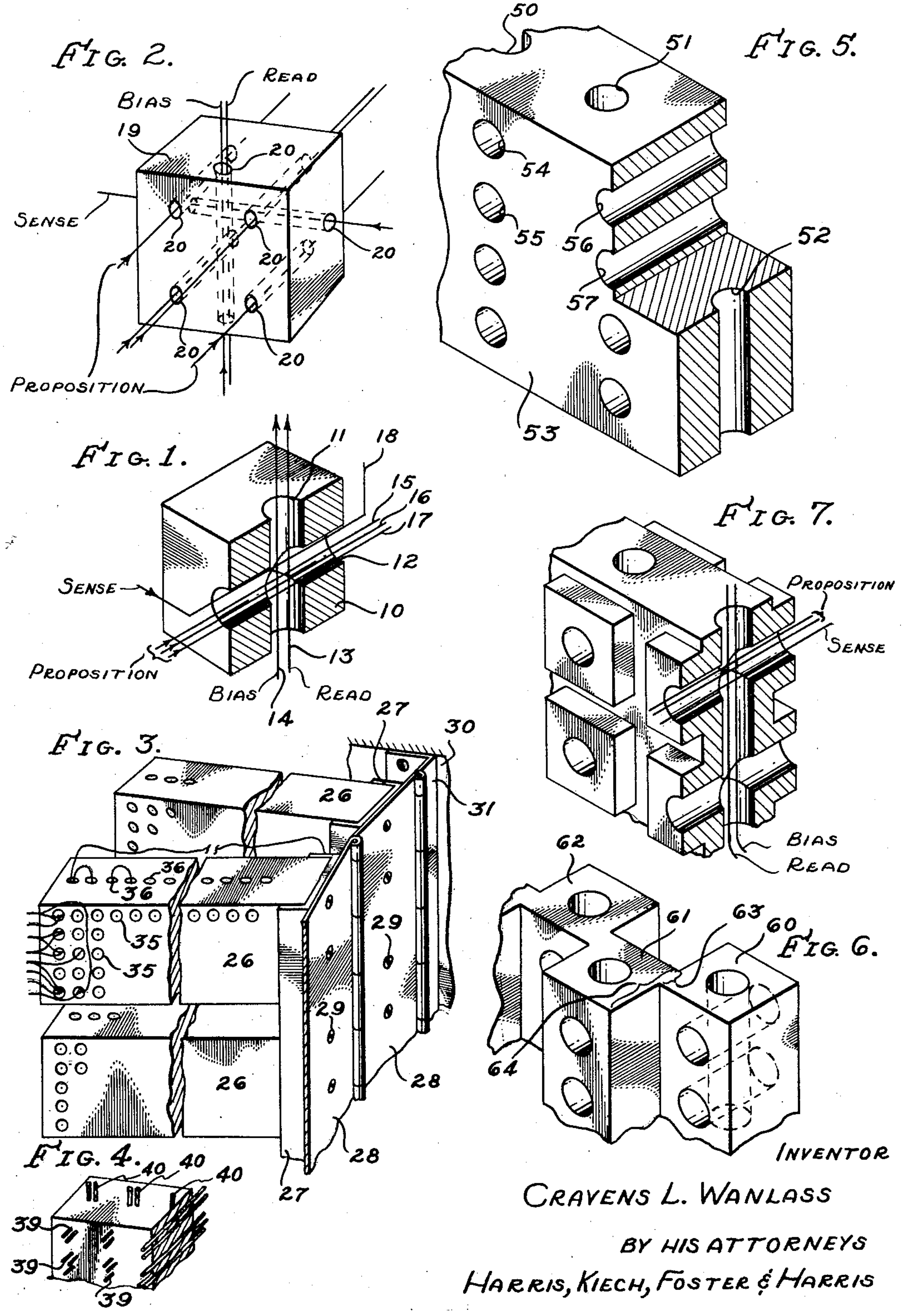
FIG. 1 shows a single gating circuit of the invention.
FIG. 2 shows an alternative embodiment of the unit of FIG. 1.
FIG. 3 shows a plurality of interconnected gating circuits mounted in a hinged assembly.
FIG. 4 shows an alternative form for one of the sheets of FIG. 3.
FIGS. 5, 6 and 7 show other alternative forms for the sheets of FIG. 3.

In an AND gate, an output indication is produced when all of a plurality of possible input conditions exist. In an OR gate, an output indication is produced when any one of a plurality of possible input conditions exists. When the AND or OR gate provides such an output indication, the logical operation being handled by the gating circuit is referred to as plus or true or on or one. Conversely, when there is no output indication, the logical operation is referred to as minus or false or off or zero. These same terms are also used in referring to the existence or absence of the input conditions or propositions. For example, when all the input propositions to an AND gate are true, a true output indication will be produced. But if only two of three input propositions are true and the third is false, there will be no output indication or a false indication. In an OR gate, there will be a true output indication when one or more of the input propositions are true.

Referring now to FIG. 1, a block 10 of magnetic material is provided with a pair of orthogonally disposed, intersecting openings 11, 12 which pass through the block adjacent each other, the block being shown cut vertically down the center. The particular type of magnetic material utilized is not critical, but it is preferably material having a nonsquare hysteresis loop permitting operation in the vicinity of the knee of the saturation curve. Ferrite is a perferable material from the manufacturing view and provides satisfactory operation of the gating circuit.

An electrical conductor referred to as the read conductor 13 and another electrical conductor referred to as the bias conductor 14 are passed through the opening 11. A plurality of electrical conductors referred to as proposition conductors 15, 16, 17 are passed through the other opening 12 with the proposition conductors parallel to each other and perpendicular to the read and bias conductors 13, 14. Another conductor referred to as a sense conductor 18 is also passed through the opening 12 perpendicular to the read and bias conductors.

A current in the bias conductor will produce a magnetic flux field about the bias and read conductors. Negligible magnetic flux will enclose the sense and proposition conductors which are orthogonal to the bias conductor. Now a current of significant magnitude in the sense conductor will set up a flux about the sense and proposition conductors and will cause a collapse of the flux about the read conductor. This flux collapse or demagnetization results from interference between the two orthogonally created flux fields. The flux change about the read conductor induces the output voltage in the read conductor.

Suppose a current in a proposition conductor precedes the current in the sense conductor. Then the proposition conductor current will produce the flux change from about the read conductor to about the proposition and sense conductors. The subsequent current in the sense conductor will then produce no flux change about the read conductor as the flux field is already established about the sense conductor.

Because of the orthogonal relation of the flux fields and the currents which produce the fields, there is no electromagnetic or electrostatic coupling between the proposition and sense conductors and the read conductor, i.e., there is no conventional or transformer type magnetic coupling present. The input to the device is coupled to the output only through interaction of the orthogonal flux fields. This type of logic device provides a high signal-to-noise ratio and permits ORing of a large number of AND gates without the usual problem of poor signal-to-noise ratio in the OR line. Only a small volume of magnetic material is required and the operation of the device is not critically dependent upon the shape of the hysteresis loop, permitting operation at very high speeds. The drive current requirement for the proposition conductors is quite small and permits the use of transistors as drivers. Transistors may also be used to provide the bias and sense currents. The logic unit is entirely passive in nature, utilizing only magnetic material and electrical conductors, and once properly fabricated, has substantially no maintenance problems.

First consider the operation of the gating circuit of FIG. 1 as an AND gate. A D.C. current is connected to to the bias conductor 14 of a magnitude sufficient to produce a magnetic flux in the magnetic material adjacent the bias conductor approximating the knee of the saturation curve of the magnetic material. If an input proposition is true, no current is connected to the corresponding proposition conductor, while if the input proposition is false, a current of a magnitude sufficient to saturate the magnetic material in the area of the bias conductor is connected to the proposition conductor. When it is desired to read the condition of the gate, a current pulse, sometimes referred to as a clock pulse, is applied to the sense conductor 18. This current pulse should be of a magnitude to produce saturation or near saturation of the magnetic material in the area of the bias conductor in the absence of current in any of the proposition conductors.

Consider an example in which all but one proposition are true, i.e., there is current in only one of the proposition conductors, say the conductor 15. The bias current in the bias conductor 14 has partially saturated the region surrounding the read and bias conductors 13, 14. The false proposition current in the conductor 15, being larger than the bias current, produces a magnetic flux which saturates the region around the proposition conductor and, in the zone where the read, bias and proposition conductors cross, cause the flux produced by the bias current to collapse. Then when the sense current pulse is applied to the sense conductor 18 no significant flux changes occur in the zone because this zone is already saturated due to the proposition current. Therefore, there will be no indication occurring on the read conductor 13, corresponding to a false or zero output from the gate.

Next consider the situation in which all propositions to the AND gate are true. There is no current in any of the proposition conductors and the zone of magnetic material at the crossing of the various conductors is not saturated. Then when the sense current pulse is applied, the flux due to the sense current will produce saturation in the zone and cause a collapse of the bias flux around the bias and read conductors. This collapse of bias flux induces an E.M.F. in the read conductor providing an output pulse on the read conductor indicating that the proposition is true or plus. The circuitry connected to the read conductor 13 can be blanked except during the time when the sense pulse is applied to remove any problem of erroneous read out.

While it is not necessary that the read and bias conductors be exactly perpendicular to the other conductors, it is preferable to maintain these conditions as close as possible, since departures from the orthogonal relations introduce undesired noise and reduce the sensitivity of the gating circuit. The direction of currents in the conductors is not significant except for the proposition currents which should all be in the same direction, since the gating circuit utilizes the perpendicular magnetic fields and does not rely upon polarities.

The gating circuit of FIG. 1 can be used as an OR gate in several ways. In one form, the input propositions are considered true when there is current in the corresponding proposition conductor. This is the opposite of the AND gate previously described. Then a true indication must be obtained on the read conductor when one or more of the proposition conductors carry current. When one or more of the proposition conductors carry current, the intersection zone of the magnetic material will be saturated and the current sense pulse will produce no or very small E.M.F. in the read conductor. Thus when the gating circuit of FIG. 1 is used as an OR gate, a true output indication consists of no voltage change on the read conductor when the sense pulse is applied. When a voltage pulse is produced on the read conductor, it is an indication that none of the proposition conductors carry current and the function computed by the gating circuit is false.

The use of the gating circuit of FIG. 1 as an OR gate as described above is not preferred because it is standard practice to use a pulse for the true condition and no pulse for the false condition whereas the output of this particular OR gate is the reverse.

An alternative form of OR gate may be produced by using a plurality of AND gates as shown in FIG. 1 with the read conductors of the gates connected in series. Then when one or more of the AND gates are true, an output pulse is produced on the read conductor resulting in the desired pulse indication for true condition of an OR gate.

In another alternative form for an OR gate, a plurality of the AND gates can be utilized with the read conductors connected in parallel. Then if one or more of the AND gates are true, an output pulse is produced on the read conductor providing a pulse indication for a true OR gate condition. It is also possible to use a plurality of the AND gates with groups of serially connected read conductors connected in parallel or with groups of parallel connected read conductors connected in series.

An alternative embodiment of the gating circuit of FIG. 1 is shown in FIG. 2, wherein a block 19 of magnetic material is provided with a plurality of orthogonally disposed openings 20. The bias and read conductors are positioned in one of the openings 20, the sense conductor is positioned in another of the openings 20 perpendicular to the bias and read conductors, and the proposition conductors are positioned in other of the openings 20 parallel to each other and perpendicular to the bias and read conductors. The operation of this embodiment either as an AND gate or an OR gate is similar to that described in connection with the embodiment of FIG. 1.

It is not essential that the sense and proposition conductors be parallel to each other, but only that both the sense and proposition conductors be perpendicular to the bias and read conductors. Stated differently, the fundamental requirement for the gating circuit of the invention is that the magnetic field which is created by the bias current and which induces the output in the read conductor be substantially orthogonal to the magnetic field created by the proposition currents and the magnetic field created by the sense current. Furthermore, more than one gate can be provided in a block such as the block 10 of FIG. 1, since a number of nonparallel openings can be formed lying in a plane perpendicular to the opening 11, including the opening 12. A set of sense and proposition conductors can be placed in each of these perpendicular openings with each of such sets operating independently in conjunction with the read and bias conductors.

FIG. 3 also illustrates how a plurality of the gating circuits of the invention may be assembled in a small, compact unit. A plurality of sheets 26 of the magnetic material are mounted in groups in brackets 27 with each bracket being fixed to a hinged plate 28 by suitable means such as screws 29. The hinged plates are coupled in series and may be fixed to a wall or case 30 by a bracket 31 permitting the groups of sheets to be compactly arranged in parallel planes for minimum space requirements and to be fanned out as shown in FIG. 3 for assembly and testing.

The sheets 26 may be used singly or in groups depending upon the number of gating circuits required in the particular application. A sheet is provided with a plurality of horizontal openings 35, preferably arranged in rows of vertical columns so that vertical openings 36 pass adjacent to or intersect all of the horizontal openings in a single column. Each of the horizontal openings 35 corresponds to an AND gate such as shown in FIG. 2 with the sense and proposition conductors passing through the horizontal opening and the read and bias conductors passing through the vertical opening. A vertical column of AND gates with a common read conductor will function as an OR gate as described previously. The particular connections of the gates in a sheet or group of sheets is dependent upon the logical operations to be carried out and may be performed by one skilled in the computer art once the novel features of applicant's individual gating circuits are understood.

An indication of the compactness achievable by the gating circuit of the invention is gathered from the fact that sixteen of the horizontal openings 35 may be provided per lineal inch of the sheet of magnetic material, thereby giving two hundred and fifty-six gates per square inch of sheet. The sheets may be made by conventional methods such as drilling, casting, and the like. It is also possible to mold the sheets of green unfired ferrite with the openings therein and then fire the ferrite to harden and cure it. In some applications only alternate openings may be wired with the intervening openings providing for magnetic isolation between circuits.

An alternative form of the gating circuit is shown in FIG. 4 wherein no openings are provided in the magnetic material. In this unit, the groups of conductors which form each of the individual gates are positioned in a fixture so that groups 39 of sense and proposition conductors cross groups 40 of bias and read conductors forming the individual gates at the crossings as in the previous embodiments. Then a mass of uncured ferrite is placed in the fixture filling all the space between the conductors. The assembly is then fired to harden and cure the ferrite, after which the unit is removed from the fixture substantially in the form shown in FIG. 4 and is ready for connection into the rest of the computer.

Another form for the magnetic material of the gating circuit of the invention is shown in FIG. 5. Openings 50, 51, 52 for the read and bias conductors are provided in a block or sheet 53 of magnetic material at right angles to openings 54, 55, 56, 57 for the sense and proposition conductors. These orthogonal openings do not intersect but are so positioned that the opening 50 is close to the column of openings including 54 and 55 and the opening 51 is close to the column including the openings 56 and 57, these adjacent orthogonal openings sharing the common magnetic material which separates them to provide gates which operate in the same manner as those of FIGS. 1 and 2. The spacing between corresponding orthogonal openings which make up a single gate should be kept small while the spacing between adjacent parallel openings should be several times this small figure so as to substantially eliminate flux interactions between gates. The nonintersecting hole structure is much easier to wire than the intersecting hole structure such as shown in FIG. 1 since there are no perpendicular intersecting conductors.

Greater magnetic isolation between gates can be obtained when necessary by using sheets or blocks of magnetic material having irregular surfaces such as those shown in FIGS. 6 and 7. In the structure of FIG. 6, the horizontal openings corresponding to the openings 35 of FIG. 3 are disposed in columns 60, 61, 62 with a vertical opening corresponding to the vertical openings 36 of FIG. 3 for each column. The sides of the sheet of magnetic material are generally corrugated in form such that the cross-sectional area of the junction area between adjacent columns as indicated by the brace 63 is considerably less than the cross-sectional area of a column itself as indicated by the brace 64.

Another form for the magnetic sheet to improve the magnetic isolation is shown in FIG. 7 wherein the cross-sectional area of the magnetic material adjacent the intersecting openings is considerably greater than the cross-sectional area of the magnetic material at points between intersections. The magnetic material structures of FIGS. 6 and 7 are especially adapted to production by molding from unfired ferrite as previously described, either with the openings as shown in FIGS. 6 and 7 or with the conductors molded in place as shown in FIG. 4.

Although exemplary embodiments of the invention have been disclosed and discussed, it will be understood other applications of the invention are possible and that the embodiments disclosed may be subjected to various changes, modifications and substitutions without necessarily departing from the spirit of the invention.

I claim as my invention:

1. In a logical gate circuit, the combination of: a unitary block of magnetic material having first and second current axes therethrough substantially perpendicular to each other, and including a first flux path about said first axis, and a second flux path about said second axis perpendicular to said first flux path, said magnetic material having a saturation curve with a knee; a bias conductor and a read conductor positioned along said first current axis; means for generating a current in said bias conductor to produce a first magnetic flux in said first path of a magnitude near said knee; a sense conductor and at least one proposition conductor positioned along said second axis; means for generating a current in said proposition conductor to produce a second magnetic flux along said second path of magnitude to saturate said magnetic material, with said second flux causing a collapse of said first flux; and means for generating a current in said sense conductor to produce a third magnetic flux along said second path of a magnitude to saturate said magnetic material, with said third flux causing a collapse of said first flux in the absence of said second flux, with flux change in said first path producing an output pulse along said first current axis with the polarity of said output pulse being a function of the polarity of said first magnetic flux and independent of the polarities of said second and third magnetic fluxes.

2. In a logical gate circuit, the combination of: a plurality of blocks of magnetic material, each of said blocks having first and second current axes therethrough substantially perpendicular to each other, and including a first flux path about said first axis, and a second flux path about said second axis perpendicular to said first flux path, said magnetic material having a saturation curve with a knee; a bias conductor and a read conductor positioned along said first current axis of each block; means for generating a current in each of said bias conductors to produce a first magnetic flux in said first path of a magnitude near said knee; a sense conductor and at least one proposition conductor positioned along said second axis of each block; means for generating a current in each of said proposition conductors to produce a second magnetic flux along said second path of a magnitude to saturate said magnetic material, with said second flux causing a collapse of said first flux; means for generating a current in each of said sense conductors to produce a third magnetic flux along said second path of a magnitude to saturate said magnetic material, with said third flux causing a collapse of said first flux in the absence of said second flux in a particular block, with flux change in the first path of a particular block producing an output pulse along said first current axis of such block with the polarity of said output pulse being a function of the polarity of said first magnetic flux in such block and independent of the polarities of said second and third magnetic fluxes in such block, and circuit means for connecting the read conductors in a series-parallel combination.

3. In a logical gate circuit, the combination of: a plurality of blocks of magnetic material, each of said blocks having first and second current axes therethrough substantially perpendicular to each other, and including a first flux path about said first axis, and a second flux path about said second axis perpendicular to said first flux path, said magnetic material having a saturation curve with a knee; a bias conductor and a read conductor positioned along said first current axis of each block; means for generating a current in each of said bias conductors to produce a first magnetic flux in said first path of a magnitude near said knee; a sense conductor and at least one proposition conductor positioned along said second axis of each block; means for generating a current in each of said proposition conductors to produce a second magnetic flux along said second path of a magnitude to saturate said magnetic material, with said second flux causing a collapse of said first flux; means for generating a current in each of said sense conductors to produce a third magnetic flux along said second path of a magntiude to saturate said magnetic material, with said third flux causing a collapse of said first flux in the absence of said second flux in a particular block, with flux change in the first path of a particular block producing an output pulse along said first current axis of such block with the polarity of said output pulse being a function of the polarity of said first magnetic flux in such block and independent of the polarities of said second and third magnetic fluxes in such block; and circuit means for connecting the read conductors in series with each other.

4. In a logical gate circuit, the combination of: a plurality of blocks of magnetic material, each of said blocks having first and second current axes therethrough substantially perpendicular to each other, and including a first flux path about said first axis, and a second flux path about said second axis perpendicular to said first flux path, said magnetic material having a saturation curve with a knee; a bias conductor and a read conductor positioned along said first current axis of each block; means for generating a current in each of said bias conductors to produce a first magnetic flux in said first path of a magnitude near said knee; a sense conductor and at least one proposition conductor positioned along said second axis of each block; means for generating a current in each of said proposition conductors to produce a second magnetic flux along said second path of a magnitude to saturate said magnetic material, with said second flux causing a collapse of said first flux; means for generating a current in each of said sense conductors to produce a third magnetic flux along said second path of a magnitude to saturate said magnetic material, with said third flux causing a collapse of said first flux in the absence of said second flux in a particular block, with flux change in the first path of a particular block producing an output pulse along said first current axis of such block with the polarity of said output pulse being a function of the polarity of said first magnetic flux in such block and independent of the polarities of said second and third magnetic fluxes in such block; and circuit means for connecting the read conductors in parallel with each other.

5. A gate circuit as defined in claim 1 in which said block of magnetic material comprises a mass of fired ferrite material formed about said conductors.

6. In a logical gate circuit, the combination of: a unitary block of magnetic material having first and second openings therethrough substantially perpendicular to each other, and including a first flux path about said first opening, and a second flux path about said second opening perpendicular to said first flux path, said magnetic material having a saturation curve with a knee; a bias conductor and a read conductor positioned in said first opening; means for generating a current in said bias conductor to produce a first magnetic flux in said first path of a magnitude near said knee; a sense conductor and at least one proposition conductor positioned in said second opening; means for generating a current in said proposition conductor to produce a second magnetic flux along said second path of a magnitude to saturate said magnetic material, with said second flux causing a collapse of said first flux; and means for generating a current in said sense conductor to produce a third magnetic flux along said second path of a magnitude to saturate said magnetic material, with said third flux causing a collapse of said first flux in the absence of said second flux, with flux change in said first path producing an output pulse on said read conductor with the polarity of said output pulse being a function of the polarity of said first magnetic flux and independent of the polarities of said second and third magnetic fluxes.

7. A gate circuit as defined in claim 6 in which said openings are intersecting.

References Cited in the file of this patent

UNITED STATES PATENTS

| | | |
|---|---|---|
| 2,724,103 | Ashenhurst | Nov. 15, 1955 |
| 2,732,542 | Minnick | Jan. 24, 1956 |
| 2,743,507 | Kornei | May 1, 1956 |
| 2,746,130 | Davis | May 22, 1956 |
| 2,802,953 | Arsenault | Aug. 13, 1957 |
| 2,810,901 | Crane | Oct. 22, 1957 |
| 2,811,652 | Lipkin | Oct. 29, 1957 |
| 2,877,540 | Austen | Mar. 17, 1959 |
| 2,878,463 | Austen | Mar. 17, 1959 |
| 2,905,834 | Arsenault | Sept. 22, 1959 |

OTHER REFERENCES

"Nondestructive Sensing of Magnetic Cores," by Buck and Frank, from Communications and Electronics, pp. 822–830, January 1954.